United States Patent
Goodsell et al.

(10) Patent No.: US 9,411,117 B1
(45) Date of Patent: Aug. 9, 2016

(54) CABLE MANAGEMENT DEVICE

(71) Applicant: HUBELL INCORPORATED, Shelton, CT (US)

(72) Inventors: John P. Goodsell, Stratford, CT (US); Douglas P. O'Connor, Richmond, RI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/795,447

(22) Filed: Jul. 9, 2015

(51) Int. Cl.
- *G02B 6/00* (2006.01)
- *G02B 6/44* (2006.01)
- *H01R 13/502* (2006.01)

(52) U.S. Cl.
CPC ............ *G02B 6/4439* (2013.01); *H01R 13/502* (2013.01)

(58) Field of Classification Search
CPC .... G02B 6/4439; H01R 13/502; H01R 13/42; H01R 13/506; H01R 25/006
USPC ........... 385/133, 134, 136, 137, 147; 439/529
See application file for complete search history.

(56) References Cited

U.S. PATENT DOCUMENTS

| | | | | |
|---|---|---|---|---|
| 6,216,987 B1 * | 4/2001 | Fukuo | ..................... | F16L 3/227 248/229.16 |
| 6,371,419 B1 * | 4/2002 | Ohnuki | ..................... | F16L 3/13 248/71 |
| D468,996 S * | 1/2003 | Sarkinen | ........................ | D8/356 |
| 6,801,704 B1 | 10/2004 | Daoud et al. | | |
| 7,534,958 B2 * | 5/2009 | McNutt | ................ | G02B 6/3897 174/101 |
| 7,607,938 B2 * | 10/2009 | Clark | ..................... | H04Q 1/136 385/135 |
| 7,734,138 B2 * | 6/2010 | Bloodworth | ......... | G02B 6/4452 385/134 |
| 8,712,206 B2 * | 4/2014 | Cooke | .................. | G02B 6/4452 385/134 |
| 2010/0108824 A1 | 5/2010 | Patchett et al. | | |
| 2010/0224737 A1 | 9/2010 | LaFontaine et al. | | |
| 2010/0310225 A1 * | 12/2010 | Anderson | ............ | G02B 6/4455 385/135 |

* cited by examiner

*Primary Examiner* — Ellen Kim

(74) *Attorney, Agent, or Firm* — Dickinson Wright PLLC

(57) ABSTRACT

A cable management device and assembly includes an electrical structure having plurality of connectors for receiving connectors of a plurality of cables. A fixed support bar is spaced from and aligned with the connectors. A plurality of cable retainer members are coupled to the support bar for managing and aligning the bundle of cables coupled to the connectors. The cable retainers have a first open recess at a first end with a central axis extending in first direction, and a second open recess at a second end with a central axis extending in a second direction perpendicular to the first central axis. The first open recess mates with the support bar to slide along the length of the bar and rotate or pivot around the bar to orient the cables in a selected position and pattern. The second open recess has a dimension for coupling with the respective cable.

18 Claims, 4 Drawing Sheets

CABLE MANAGEMENT DEVICE

FIELD OF THE INVENTION

The present invention is directed to a cable management device for aligning and positioning cables and/or electrical wires. The invention is further directed to a device for positioning a bundle or group of cables in an electrical module, panel, rack or other electrical device.

BACKGROUND OF THE INVENTION

Electrical cables are often assembled or secured as a bundle that are connected to an electrical panel or device. It is generally desirable to align the cable in a suitable manner to prevent the cables from becoming tangled and to assist the installation of the cable to desired connections. Various devices are known for attaching to the cable to maintain a uniform spacing and alignment of the cables.

Cable management devices are typically required for optical fibers to space the cables apart. The increase in band width requires additional cables to be added or relocated in the devices. Telecommunication cables are can be ties in bundles by a flexible plastic band or tie. These devices generally result in the bundle having a round or cylindrical shape and do not allow the cables to be spaced apart or adjusted.

One example of a prior cable management device is disclosed in U.S. 2010/0108824 to Patchett et al. This device includes a body formed from a resilient material. The body includes several cavities for holding the cable. The cavity has a cable holding section for receiving the cable and a smaller input section that is opened by inserting the cable into the flexible body.

Another cable management device is disclosed in the U.S. 2010/0224737 to LaFontaine et al. The device includes a cable management bar having a plurality of mounting brackets, a plurality of fasteners and a support. The support includes mounting flanges for translation association the mounting brackets. The mounting bracket has adjustable arms to position the bar relative to the support. The mounting bracket slides along the length of the bar to the desired position.

A further example of a holding device is disclosed in U.S. Pat. No. 6,801,704 to Daoud et al. The device is an optical splice holder having a base and a plurality of side walls extending from the upper surface to form channels between the walls. The cable channel has a first radius to secure the optical fiber and a second radius to grip and retain the optical fiber in the first radius.

Another example of a connector holder is disclosed in U.S. Pat. No. 7,734,138 to Bloodworth et al. The holder retains two or more fiber optic connectors in a retainer to retain a portion of a boot and dust retainer cap.

The prior devices and methods of retaining cables and optical fibers are generally suitable for the intended purpose. However, there is a continuing need in the industry for improved cable retainers for positioning the cables in a selected position.

SUMMARY OF THE INVENTION

The present invention is directed to a cable management device and a cable retainer device for retaining and positioning cables relative to a connecting panel, electrical module, face plate or other structure commonly used to support a plurality of connectors such as electrical connectors or data connectors.

The invention is further directed to a cable retainer that can position the cables independently of one another while the cables are coupled to a connector.

The cable management device of the invention is constructed to support and position various cables such as telecommunication cables, data cables, fiber optic cables and other forms of cables or wires during use. The cable management device of the invention includes a cable retainer member that is configured for coupling to a bar support and for coupling to the cable and supporting the cable with respect to the support bar.

One aspect of the invention includes a cable retainer member as a one piece member that is able to connect easily to the support bar and to the cable. The cable retainer member can be positioned at a selected location along the length of the support bar and be aligned with a respective electrical connector.

An electrical wiring device of the invention in one embodiment includes a support bar and at least one support member. The support bar is configured for mounting to an electrical cabinet, electrical module, enclosure or panel having an array of electrical connectors. A cable retainer member has one end attached to the support bar and is able slide along the length of the support bar to a selected position. The cable retainer member has a second end with an opening for receiving a cable to position the cable in a selected position relative the support bar and the surface of the wall, enclosure or panel.

The cable management device of the invention has in one embodiment is an assembly having a support bar and a plurality of cable retainer members. The cable retainer members can be attached to the support bar and positioned along the length of the support bar to position the cables in selected locations. The cable retainer members are removable from the support bar and can be selectively attached to the support bar at a selected location depending on the desired position of the cables.

One feature of the invention is to provide a cable retainer member that is configured for attaching or coupling to a support bar where the cable retainer members retains the cables in an orientation at an inclined angle with respect to a longitudinal orientation of the support bar. In one embodiment of the invention, the cable retainer member retains the cables in an orientation substantially perpendicular to a longitudinal dimension of the support bar.

Another feature of the invention is to provide a cable retainer member for a cable management device where the cable retainer member is made of a flexible plastic material. The cable retainer member has a first end with a connecting portion, such as an opening with a dimension for receiving and attaching to the support bar having a longitudinal dimension extending in a first direction. The cable retainer member has a second end opposite the first end with a connecting portion for retaining a cable extending in a second direction relative to the support bar. In one embodiment, the second end of the cable retainer member has an opening extending in a direction substantially perpendicular to the first direction.

The various features of the invention are basically attained by providing a cable management device having a support bar with a longitudinal dimension in a first orientation. A cable retainer member is removably coupled to the support bar for supporting a cable in a position with respect to the support bar. The cable retainer has a first end with an opening having a dimension and shape configured to couple to the support bar and a second end with an opening for coupling with and retaining the cable. The axis of the second opening is oriented substantially perpendicular to the axis of the first opening so that the cable extends in a direction substantially perpendicular to the longitudinal dimension of the support bar.

The features of the invention are further attained by providing cable management assembly including a support bar coupled to a support surface of an electrical enclosure where the enclosure includes a plurality of spaced apart connectors. The support bar has a longitudinal dimension extending in a direction parallel to the electrical connectors. A plurality of cable retainer members are coupled to and spaced along the length of the support bar in the longitudinal dimension of the support bar where each cable retainer member supports a cable. Each cable retainer member has a first coupling at a first end for coupling to the support bar and a second coupling at a second end for receiving the cable and orienting the cable in a longitudinal direction substantially perpendicular to the longitudinal axis of the support bar.

The features of the invention are also provided by providing a method of managing cables connected to a panel by coupling a cable retainer device to the panel, and coupling a plurality of cables to the cable retainer members to position the cables in a selected position with respect to the panel. The bar has a longitudinal dimension extending in a direction substantially parallel to the front face of the panel and the connectors on the panel. The cable retainer members are made of a flexible plastic material and have a coupling at a first end coupled to the support bar and able to slide along the bar to a desired position. A second end of the cable retainer members have coupling member for coupling to the respective cable and for positioning the cables in a direction substantially perpendicular to the longitudinal axis of the support bar.

These and other features of the invention will become apparent from the following detailed description of the invention, which in conjunction with the annexed drawings disclose various embodiments of the invention.

BRIEF DESCRIPTION OF THE DRAWINGS

The following is a brief description of the drawings in which.

DESCRIPTION OF THE INVENTION

Figure 1:
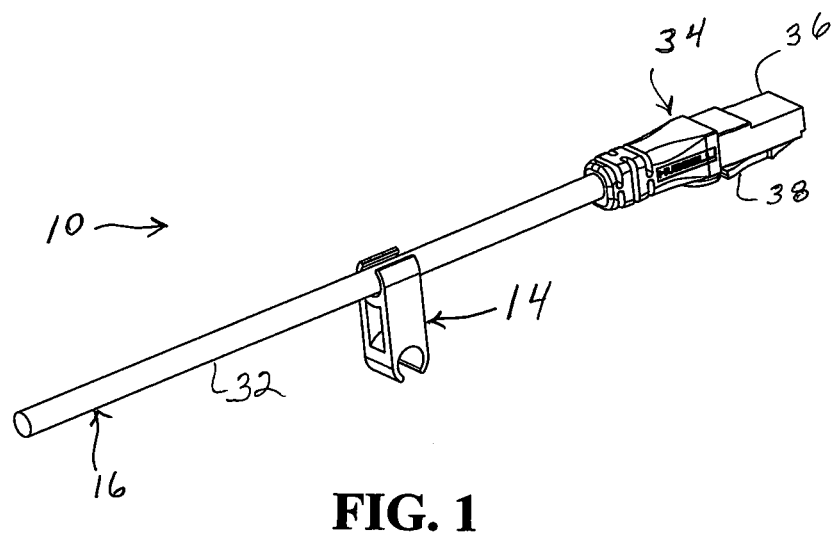
FIG. 1 is a top perspective view of the cable management device supporting a cable in one embodiment of the invention.

The present invention is directed to a cable management and cable retainer device for retaining and positioning cables relative to a connecting panel, electrical module, face plate or other structure commonly used to support a plurality of connectors such as electrical connectors or data connectors The invention is particularly directed to a cable management device and assembly that is able to support and position a plurality of cables that are connected to a panel in selected positions and angles with respect to the face of the panel. The cable management device is able support and position cables connected to a panel at one or more locations on the panel without interfering with other cables and connectors.

Referring to the drawings, the invention is directed to a cable management device and assembly 10 that includes support member 12 and one or more cable retainer members 14 for supporting a cable 16.

The support member 12 in the embodiment of the invention has a longitudinal dimension with a length for supporting a plurality of the cable retainer members 14. In the embodiment shown, the support member 12 is a support bar having a longitudinally extending body 18 and legs 20 extending from the opposite ends of the body for attaching to a suitable support structure 22. The body 18 in one embodiment has a cylindrical shape with a diameter and strength sufficient to support the cables 16 in a selected fixed position. The legs 20 in the embodiment shown are integrally formed with the body 18 and bend to an angle substantially perpendicular to the longitudinal axis of the body. In other embodiments, the legs 20 can be separate members that are attached to the ends of the body 20, such as by welding or the use of fasteners.

Figure 9:
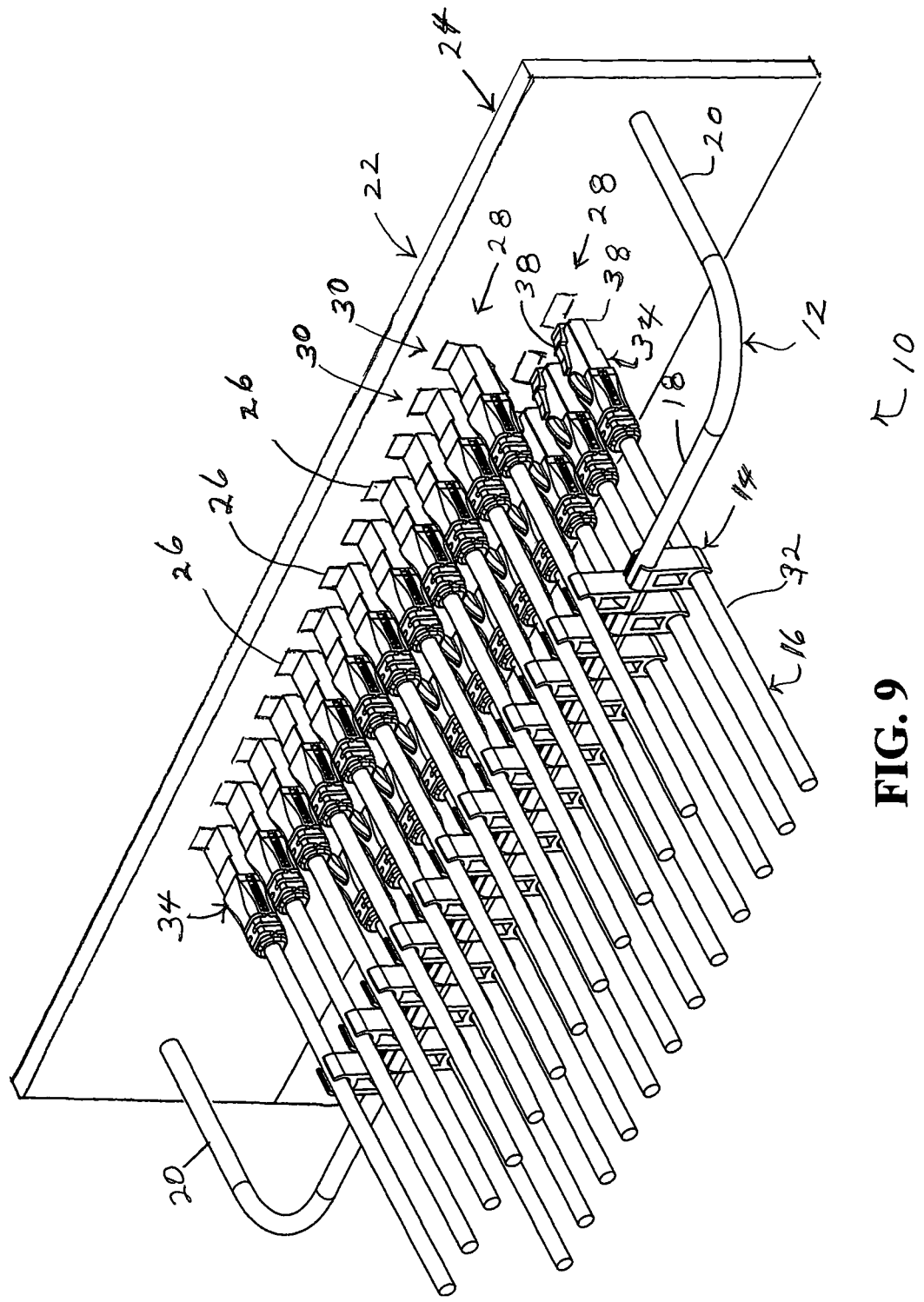
FIG. 9 is a front perspective view of the cable management device showing a plurality of cables mounted on the support bar.
Figure 10:
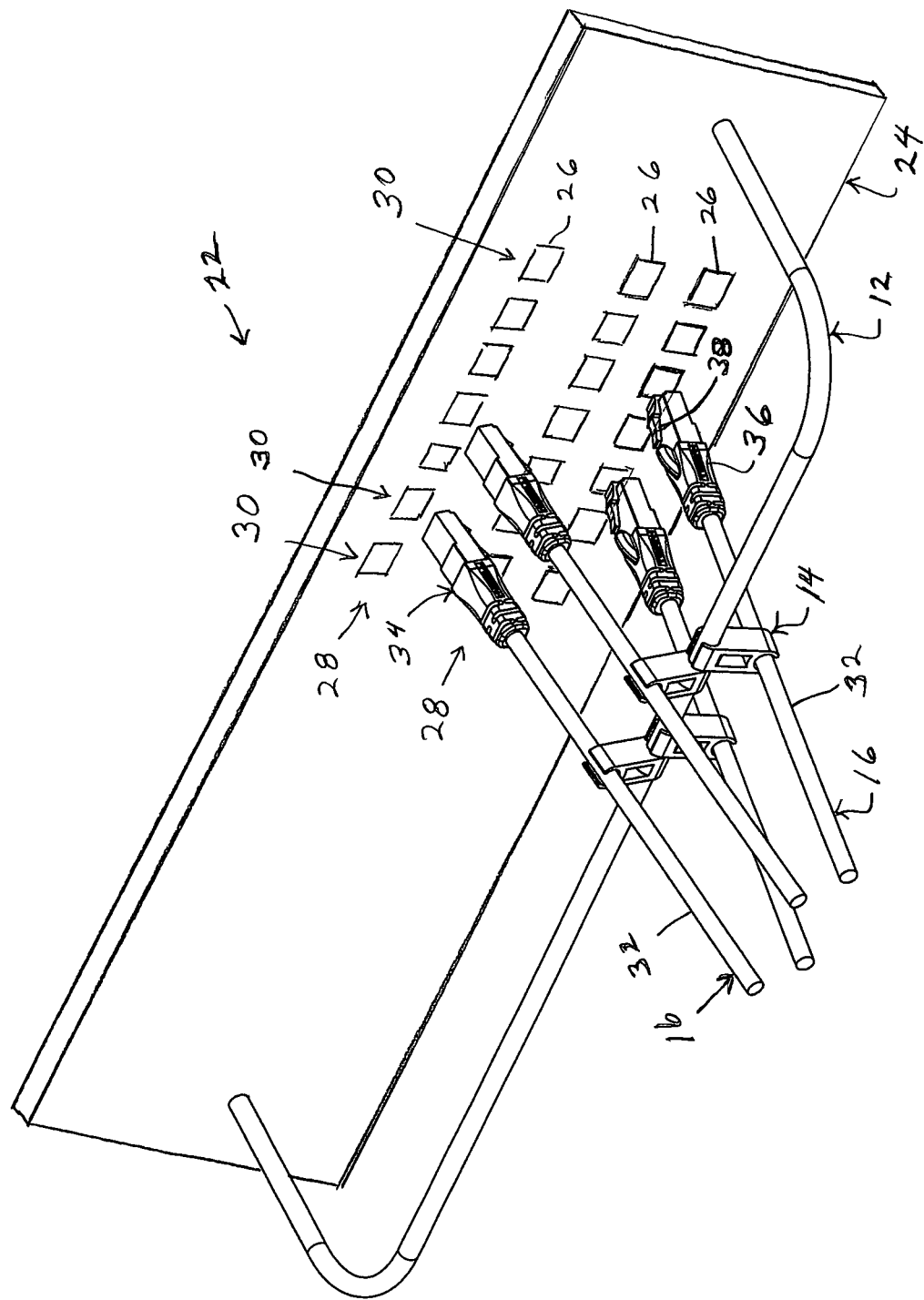
FIG. 10 is a perspective view of the cable management device showing the retainer members and the cables at different angles with respect to each other.

The support structure 22 can be an electrical panel, electrical module, face plate or the like. In the embodiment shown, the support structure is an electrical module 24 defining a support structure having a plurality of electrical connectors 26 or receptacles for connecting to a connector of a cable. The electrical connectors 26 are shown as data connectors having a recess for receiving the connector of the cables. The connectors 26 are arranged in a predetermined pattern according to the particular module 24 or panel. As shown, the connectors 26 are arranged in a series of rows 28 and columns 30 that extend across the width and height of the module 24 in a particular pattern. As shown in FIG. 9 and FIG. 10 several cables 16 are connected to selected connectors 26 in any order and location as determined by the particular needs. As shown, the cables 16 are connected to the connectors 26 oriented along the rows 28 and columns 30.

The support member 12 in the embodiment shown is coupled directly to the electrical module 24. In other embodiments, the support member can be attached to the frame, housing, support panel or other structure of the electrical module. As shown, support member 12 is in a fixed position relative to the front face of the electrical module and with respect to the connectors 26.

The body 18 of the support member 12 is spaced outwardly from the connectors 26 and extends in a direction substantially parallel to the transverse rows of the electrical connectors 26 and parallel to the front face of the electrical module 24. The body 18 of the support member 12 can be positioned directly in front of a row of the electrical connectors 26 or can be positioned between two parallel rows of electrical connectors as shown in FIG. 9. In one embodiment, the support extends across the array of connectors 26 and is spaced a substantially uniform distance from the connectors 26.

Referring to FIG. 1, the cable 16 has a body 32 with a connector 34 at one end. The cable 16 can be an electrical cable such as a data cable, fiber optic cable or other form of cable for a suitable transmission device. The connector 34 in the embodiment shown is a male connector for coupling with the recess of the connector 26 of the electrical module 24. The connector 34 has a main body portion and a connecting male end portion 36 with suitable internal wires and/or contacts for mating with the connector 26 in a conventional manner. The end portion 36 in the embodiment shown has a flexible locking spring tab 38 for coupling with the connector 26 to resist removal of the connector 34 from the connector 26.

The cable retainers 14 are substantially the same and are able to support and position a respective cable 16 on the support member 12 and with respect to the electrical module 24. Each cable retainer 14 as shown FIGS. 1-8 has a body portion 40 with a first end 42 and a second end 44. In the embodiment shown, the body portion 40 has a longitudinal dimension extending between the first end 42 and the second end 44 to define a length of the cable retainer 14. In one embodiment as shown, the length of the cable retainer 14 is greater than a width or transverse dimension of the cable retainer. The cable retainer 14 is typically made of a resilient and flexible plastic material that can snap onto the support member 12 and the respective cable 16 and effectively grip the support member.

The cable retainer 14 can be of various shapes and sizes depending on the type of cables being supported and the construction and size of the electrical module 24. In the embodiment shown, the body portion 40 has a substantially square cross section formed by a first side surface 46, and second side surface 48 opposite the first side surface 46, a third side surface 50 and a fourth side surface 52 opposite the third side surface 50. The third side surface 50 and the fourth side surface 52 extend between the first side surface 46 and the second side surface 48.

In the embodiment shown, the side surfaces of the body portion 40 are substantially flat with the opposite sides parallel to each other and the adjacent sides being perpendicular. In other embodiments the body portion 40 can have rounded surfaces or can be substantially cylindrical.

The first end 42 of the body portion 40 defines an axial face at the first longitudinal end of the body portion. The second end 44 defines an axial face at the second end of the body portion 40 opposite the first end. The axial face at the first end 42 faces outwardly from the body portion 40 in a direction substantially opposite the axial face at the second end 44. In one embodiment of the invention, the body portion 40 has a central opening 58 extending between the first side surface 46 and the second side surface 48.

The cable retainer 14 includes a coupling member at the first end 42 and a coupling member at the second end 44. The first coupling member at the first end 42 is defined by an open recess 54 with a dimension for coupling and mating with the support member 12. The open recess 54 in the embodiment shown, has a central axis 56 extending between the first side surface 46 and the second side surface 48 in a direction substantially perpendicular to the longitudinal dimension of the body portion 40.

The open recess 54 has a shape and dimension complementing the shape and outer surface of the support member 12 so that the open recess 54 is able to receive and grip the support member 12. The open recess 54 in the embodiment shown has a circular shape with an inner diameter to complement the cylindrical shape of the body 18 of the support member 12.

Figure 2:
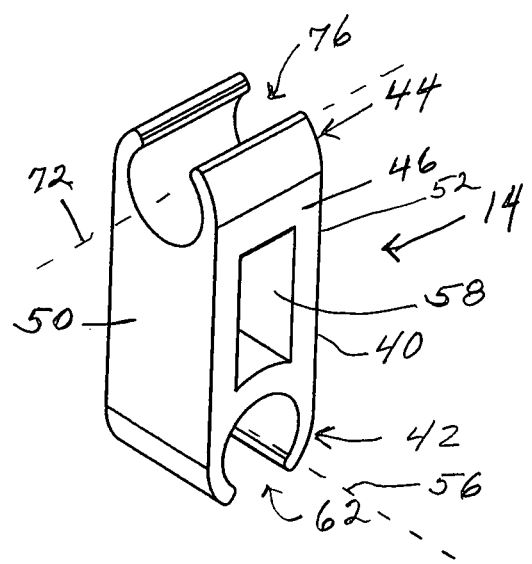
FIG. 2 is front perspective view of the cable retainer of the cable management device of FIG. 1.
Figure 3:
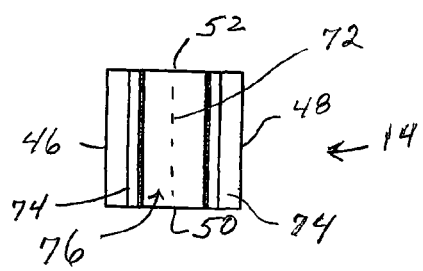
FIG. 3 is a top view of the cable retainer showing the opening for receiving the cable.
Figure 4:
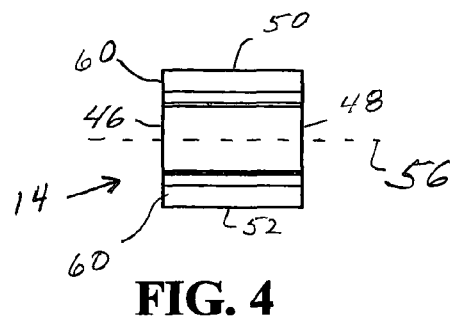
FIG. 4 is bottom view of the cable retainer of FIG. 2 showing the opening for coupling to the support bar.
Figure 5:
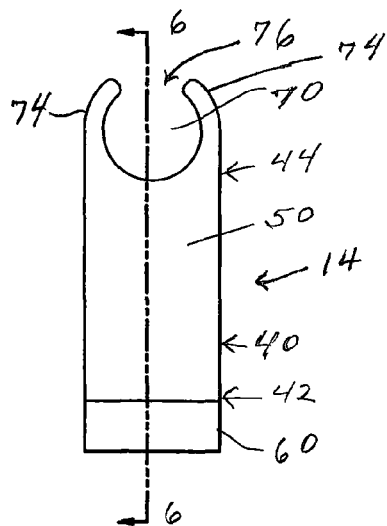
FIG. 5 is a front view of the cable retainer showing the opening for the cable.
Figure 6:
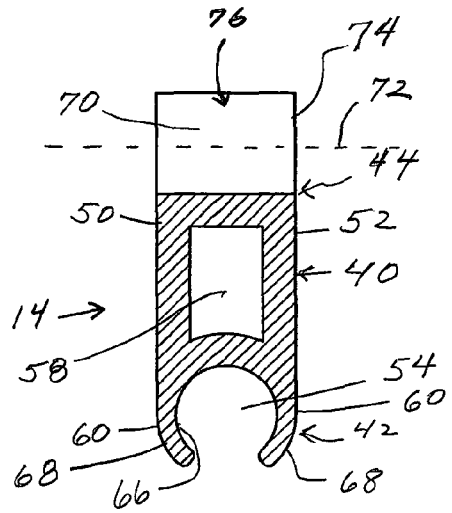
FIG. 6 is a cross sectional view of the cable retainer taken along line 6-6 of FIG. 5.
Figure 7:
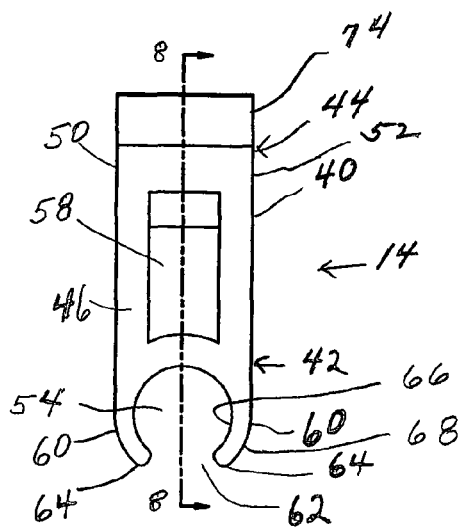
FIG. 7 is a side view of the cable retainer showing the opening for the support bar.
Figure 8:
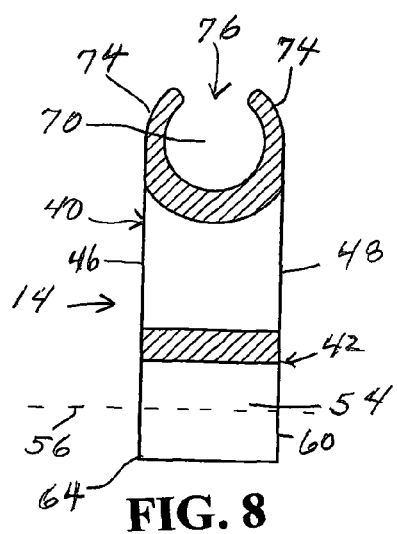
FIG. 8 is a cross-sectional view of the cable retainer taken along line 8-8 of FIG. 7.

As shown in FIG. 2, the open recess 54 is formed by a pair of legs 60 that converge inwardly to define an open portion 62 between the ends 64 of the legs 60. The open portion 62 has a dimension less than the inner diameter of the open recess 54. As shown in FIGS. 6, 7 and 8 the open portion 62 faces outwardly from the longitudinal first end 42. The legs 60 as shown have a thickness to be able to bend and deflect outward to enable attachment to the main body 36 of the support member 12. In the embodiment shown in FIGS. 2, 6 and 7, the legs 60 curve inwardly toward each other in the shape of an arc. The legs 60 have a curved concave inner surface 66 forming a continuous circle with the curvature of the open recess 54 and an outer convex surface 68. In one embodiment, the legs have a substantially continuous thickness to enable flexing of the legs 60 to receive the support member 12.

As shown in FIGS. 2 and 7, the open portion 62 of the open recess 54 faces in a longitudinal or axial dimension of the body portion 40 in a direction substantially perpendicular to the plane of the side surfaces. In other embodiments, the open portion of the open recess can be oriented to face at an inclined angle with respect to the side surfaces or in a direction facing outwardly from one of the side surfaces.

The second end 44 of the body portion has a coupling member for coupling to and supporting the cable 16. In the embodiment shown in FIGS. 2, 5 and 8 the coupling member is an open recess 70. The open recess 70 is similar to the open recess 54 at the first end 42. The open recess 70 has a central axis 72 extending through the body portion 40 in a direction substantially perpendicular to the longitudinal dimension of the body and perpendicular to the plane of the third and fourth side surfaces.

In one embodiment as shown, the central axis 72 the open recess 70 extends in a direction substantially perpendicular to the central axis 56 of the first open recess 54. In alternative embodiments the central axis 70 can be angled at an incline with respect to the central axis 56 of the first open recess 54. In this manner the central axis 70 can be in a plane parallel to the plane of the central axis 56 but extending in a different direction. Alternatively, the central axis 70 can be angled to converge with the central axis 56.

The open recess 70 in the embodiment shown has a substantially circular shape to receive and grip a cable as shown in FIG. 1. The open recess 70 is defined by legs 74 that extend from the second end 44 of the body portion 40 and converge inwardly toward each other to define an open gap 76 between the ends 78 of each leg. The open gap 76 has a dimension to allow the cable to be inserted by flexing the legs 74 outwardly and to grip and retain the cable in the open recess 70. The legs 74 in the embodiment shown have a curved configuration with a concave inner surface 78 that is continuous with the circular inner surface of the open recess 70 and a convex outer surface 80. The ends of the legs have rounded edges to assist in sliding over the cable.

In the embodiment shown, the open recess 54 and the open recess 70 are substantially the same shape and dimension. In alternative embodiments the open recesses can be a different size and shape to accommodate different support members and/or cables having different dimensions.

The cable retainer in the embodiment shown is a one piece unit typically made from a molded plastic material that is sufficiently flexible and resilient to allow the legs to flex outwardly by insertion of the cable and the support member. The legs spring back to the original position to grip the support and the cable.

As shown in FIG. 1, the cable retainer 14 is snapped onto the cable 16 by pressing the cable through the open portion 76 into the open recess 70. The legs 74 are sufficiently flexible to allow the legs to deflect outward and slide over the outer surface of the cable 16. The first end of the cable retainer 14 is then snapped onto the support member as shown in FIG. 9 and FIG. 10 to support the cable in a selected position relative to the electrical module and the support member.

As shown in FIG. 9, a plurality of the cable retainers are used simultaneously to support and manage a plurality of cables that are connected to the respective connectors in the electrical module, panel or other structure. As shown in FIG. 9, the cable retainer members 14 can be arranged in any suitable position on the support member to accommodate the position of the respective cable. The open recess of the cable retainer member grips the support member with sufficient pressure to hold the cable in the desired position while allowing the cable retainer member to slide along the length of the support member to a selected position. In the embodiment shown, the cable retainers are oriented in alternating positions so that the adjacent cable retainers support a cable coupled to a connector of the electrical module in the adjacent rows so that the cables are substantially parallel and maintained in an orderly fashion.

The cable retainers are also able to pivot about the support member as shown in FIG. 10 to support and direct the cable at an inclined angle with respect to the front face of the electrical module. The pivoting adjustment of the cable retainers on the support member enable support and management of cables connected to different rows of the connectors and to support the cables at a selected angle with respect to the front face of the electrical module.

The cable retainers and support member enable a convenient method of managing the cables and orienting the cables. The individual cable retainers simplify the installation and enable the selection of the number of cable retainers for the number of cables. The cable retainers can slide along the length and pivot about the support member to the selected position for supporting and managing the cables in the desired manner.

The method of managing the cables couples the individual cable retainer to a selected cable coupled to the electrical module. Each cable retainer is then coupled to the support member and pivoted to the desire orientation and moved along the longitudinal dimension of the support member to the position for supporting the cables.

While certain embodiments have been chosen to illustrate the invention, it will be understood that the invention is not limited to the embodiments shown and described herein.

What is claimed is:

1. A cable management device and assembly comprising:
   a fixed support bar configured for coupling to a support structure having at least one electrical connector, said support bar having a longitudinal dimension; and
   at least one cable retainer member for retaining a cable, said cable retainer member having a first end and a second end opposite said first end, a first side, a second side opposite said first side, a third side extending between said first side and second side, and a fourth side opposite said third side, a first open recess at said first end extending between said first side and second side and having a dimension to receive said support bar, and a second open recess at said second end and extending between said third side and fourth side and having a dimension to receive a cable and support the cable in a fixed position relative to said support bar.

2. The cable management device and assembly of claim 1, wherein
   said first open recess has a substantially circular configuration with a first inner dimension, and a first open portion with a second dimension less than said first dimension of said first open recess; and
   said second open recess has a substantially circular configuration with an inner dimension, and a second open portion with a dimension less than said inner dimension of said second open recess.

3. The cable management device and assembly of claim 2, wherein
   said first open portion of said first open recess is defined by inwardly extending flexible legs having a respective end, said legs being flexible to enable positioning on and gripping said support bar; and
   said second open portion of said second open recess is defined by inwardly extending flexible legs having a respective end, said legs being flexible to enable said cable to be received in said second open recess.

4. The cable management device and assembly of claim 3, wherein
   each said retainer member is made of a flexible plastic material.

5. The cable management device and assembly of claim 4, further comprising
   a plurality of said retainer members coupled to said support bar for supporting a respective cable, each said retainer members being independently positioned by sliding on said support bar in the longitudinal dimension of said support bar and pivoting around said support bar.

6. The cable management device and assembly of claim 1, wherein
   each said retaining members have a first longitudinal end face and a second longitudinal end face opposite of said first end face, said first open recess being formed in said first longitudinal end face and said second open recess being formed in said second longitudinal end face.

7. The cable management device and assembly of claim 6, wherein
   said first open recess has an axis extending between said first side and second side, and said second open recess has an axis extending between said third side and said fourth side and substantially perpendicular to said axis of said first open recess.

8. A cable management device and assembly comprising:
   an electrical module in a support structure, said electrical module having a plurality of first connectors arranged in a predetermined pattern, said first connectors being configured for connecting with a second connector of a cable;
   a fixed support member in a fixed position spaced from and aligned with said first connectors, said support member having a longitudinal dimension extending in a direction complementing the pattern of the first connectors; and
   a plurality of cable retainer members for retaining a respective cable connected to a respective first connector and for aligning the cables in a predetermined pattern, each said cable retainer member being made of a resilient, flexible material and having a first end with a first opening configured for coupling to said support member, said first opening having a first central axis extending in a first direction, and a second end with a second opening configured to receive the respective cable, said second opening having a second central axis extending in a second direction substantially perpendicular to said central axis of said first opening.

9. The cable management device and assembly of claim 8, wherein
   said support member is a bar spaced from and overlying at least one of said first connectors.

10. The cable management device and assembly of claim 9, wherein
    said bar has a cylindrical shape whereby said first end of said retainer members are able to slide on said bar in the longitudinal dimension and rotate around said cylindrical shaped bar.

11. The cable management device and assembly of claim 8, wherein
- each said retaining member has a first side, a second side opposite said first side, a third side extending between said first side and said second side, and a fourth side opposite said third side, and where said first opening extends between said first side and second side, and said second opening extends between said third side and fourth side.

12. The cable management device and assembly of claim 8, wherein
- said first opening is an open recess having an open side portion for receiving said support member and having a central axis extending in a first direction.

13. The cable management device and assembly of claim 12, wherein
- said second opening is an open recess having an open side portion for receiving the cable and having a second axis extending in a second direction substantially perpendicular to said first direction.

14. The cable management device and assembly of claim 13, wherein
- each said retaining member has a first longitudinal face extending between said first side and second side, and where said first open portion of said first open recess is formed in said first longitudinal face.

15. The cable management device and assembly of claim 14, wherein
- each said retaining member has a second longitudinal face extending between said first side and second side opposite said first longitudinal face, and where said second open portion of said second open recess is formed in said second longitudinal face.

16. A method of managing and supporting a plurality of cables connected to an electrical module, said method comprising the steps of:
- coupling a plurality of cables to the module, said module having a plurality of connectors arranged in a predetermined pattern, and a support bar spaced from and aligned with the connectors;
- providing a plurality of cable retainers, each cable retainer having a longitudinal dimension with a first open recess at a first end extending in a first direction and a second open recess and a second end extending in a second direction substantially opposite said first direction, coupling the first open recess of each cable retainer on the support bar in a selected position and orientation, and coupling each of the cables to a second open recess of a respective cable retainer to align said cables in a bundle with respect to the connectors of the electrical module.

17. The method of claim 16, further comprising
- sliding said cable retainers on said support bar to a selected position and rotating said cable retainers on said support bar to a selected orientation to position the cables at a selected angle with respect to each other.

18. The method of claim 17, wherein
- said cable retainer has a first longitudinal surface where said first open recess is formed in said first longitudinal surface, and
- said cable retainer has a second longitudinal surface facing opposite said first longitudinal face where said second open recess is formed in said second longitudinal face.

\* \* \* \* \*